United States Patent [19]

Wagner et al.

[11] 4,022,377
[45] May 10, 1977

[54] THERMOSTATICALLY OPERATED SLEEVE VALVE CONSTRUCTION

[75] Inventors: Joseph P. Wagner, Knoxville; Boyd P. Sliger, Concord, both of Tenn.

[73] Assignee: Robertshaw Controls Company, Richmond, Va.

[22] Filed: Feb. 20, 1975

[21] Appl. No.: 551,346

[52] U.S. Cl. .......................... 236/34.5; 236/93 A; 251/333
[51] Int. Cl.² ........................................ F01P 7/02
[58] Field of Search .............. 236/34, 34.5, 93 A; 251/333, 121, 122, 210

[56] References Cited

UNITED STATES PATENTS

| 1,588,645 | 6/1926 | Barrett | 251/121 X |
|---|---|---|---|
| 2,576,877 | 11/1951 | Golob | 236/34 |
| 3,087,676 | 4/1963 | Neher, Jr. et al. | 236/34 |
| 3,127,104 | 3/1964 | Puster | 236/34 |
| 3,179,339 | 4/1965 | Woods | 236/34 |
| 3,448,921 | 6/1969 | Kelly | 236/34 |
| 3,575,342 | 4/1971 | Puster | 236/34 |
| 3,765,448 | 10/1973 | Dussia | 251/333 X |

Primary Examiner—William E. Wayner
Assistant Examiner—William E. Tapolcai, Jr.
Attorney, Agent, or Firm—Candor, Candor & Tassone

[57] ABSTRACT

A thermostatically operated valve construction for an engine coolant system and having a tubular sleeve valve member for opening and closing an annular valve seat of the construction at one end of the tubular sleeve valve member that is interconnected to a temperature responsive device, the sleeve valve member having a part thereof projecting from the one end thereof into and closely adjacent the annular valve seat when the sleeve valve member is between a closed position and a partially opened position to thereby meter the flow through the valve seat during a substantial portion of the initial opening movement of the sleeve valve member.

1 Claim, 10 Drawing Figures

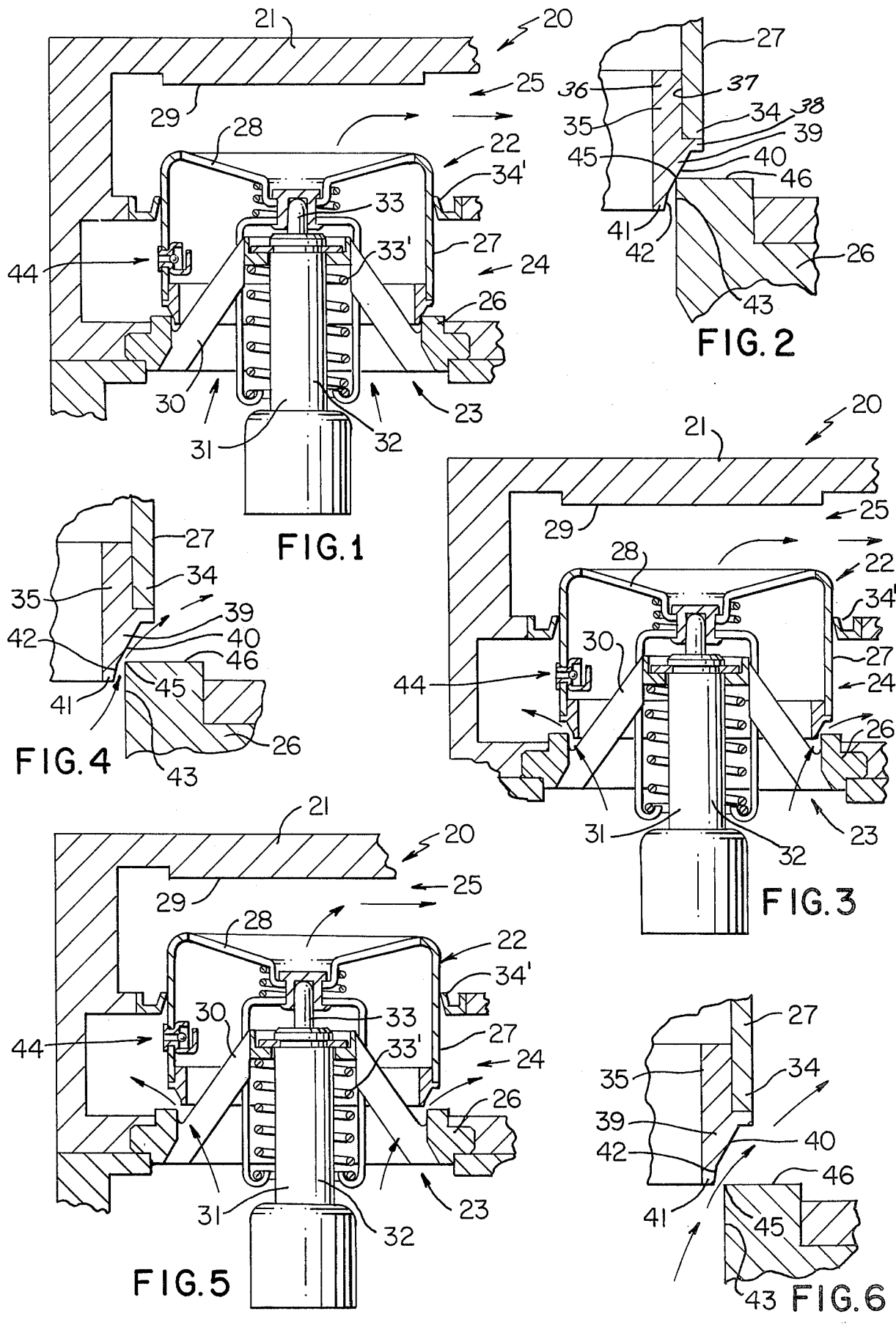

THERMOSTATICALLY OPERATED SLEEVE VALVE CONSTRUCTION

This invention relates to an improved engine coolant system and a thermostatically operated valve construction for such a system or the like.

It is well known that engine coolant systems have been provided wherein each has a thermostatically operated valve construction disposed between the engine radiator and the flow of coolant from the engine so that at temperatures of the coolant below the start-to-open temperature of the valve construction, all of the coolant is diverted or by-passed by the valve construction to a bypass circuit that leads to the water pump inlet so that no coolant will flow to the radiator. As the temperature reaches the start-to-open temperature of the valve construction, the flow of coolant from the engine is diverted to the radiator and bypass circuits in a proportion depending on the actual value of the temperature of the coolant from the engine. At the fully open temperature of the valve construction, a sleeve valve member of the thermostatically operated valve construction abuts against the top of the housing containing the same to close off the top portion of the sleeve and thereby forcing all the flow of the coolant from the engine to the radiator for maximum cooling of the coolant. Such systems are disclosed in the patents to Wagner, U.S. Pat. Nos. 2,919,860 and 3,734,405.

In the past, truck designers have relied upon the above described thermostatically operated valve construction to control coolant temperatures of the truck engines in combination with temperature responsive radiator shutters disposed in front of the radiators. In this manner, each set of shutters remain closed until the coolant temperature for the respective engine reaches a point slightly above the start-to-open temperature for the valve construction and then be fully opened near the fully open temperature of the valve construction. When closed, each set of shutters prevents cooling by the respective radiator resulting in the valve construction and shutter complimenting each other to permit fast warm up of the engine and smoother temperature control thereof.

However, truck engine noise has become a problem due to the recent interest in noise pollution. Thus, with the shutters closed, the fan noise of a truck engine is rather high so that it is desired that the radiator shutters be removed from trucks.

However, this relegates the entire coolant temperature control function to the thermostatically operated valve construction and traditionally these valve constructions each used a relatively large cylindrically shaped sleeve valve member that sets flat on the metal flange of the valve seat and as soon as the temperature reaches the desired value, the sleeve valve member lifts off the valve seat permitting coolant flow to the radiator. Since the total coolant flow required at the fully open temperature is fairly high, the lift of the sleeve valve member for each degree of temperature rise is high so that a relatively small increase in temperature results in a rather large increase in flow. Thus, small changes in temperature result in large changes in flow whereas the shutters sensing the same temperature have helped to control the coolant temperature and smooth out the temperature cycles.

Accordingly, it is a feature of this invention to provide a thermostatically operated valve construction that will reduce the coolant flow per degree temperature change near the start-to-open temperature range and thereafter control the coolant flow in the conventional manner.

In particular, one embodiment of this invention provides a thermostatically operated valve construction having a tubular sleeve valve member for opening and closing an annular valve seat of the construction at one end of the tubular sleeve valve member that is interconnected to a temperature responsive device that moves the sleeve valve member relative to the valve seat in relation to sensed temperature, the sleeve valve member having means projecting from the one end thereof into and closely adjacent the annular valve seat when the sleeve valve member is between a closed position and a partially opened position to thereby meter the flow through the valve seat during a substantial portion of the initial opening movement of the sleeve valve member.

Accordingly, it is an object of this invention to provide an improved engine coolant system having one or more of the novel features set forth above or hereinafter shown or described.

Another object of this invention is to provide an improved thermostatically operated valve construction having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a fragmentary, cross-sectional view illustrating the improved engine coolant system of this invention utilizing the improved thermostatically operated valve construction of this invention, the valve construction being in the fully closed position thereof.

FIG. 2 is an enlarged fragmentary view illustrating the condition of the valve member and valve seat of FIG. 1.

FIG. 3 is a view similar to FIG. 1 and illustrates the thermostatically valve construction in an initial open position thereof.

FIG. 4 is a view similar to FIG. 2 and illustrates the cooperating function of the valve member and valve seat of FIG. 3.

FIG. 5 is a view similar to FIG. 1 and illustrates the valve construction in a more open condition thereof than the open condition of FIG. 3.

FIG. 6 is a view similar to FIG. 2 and illustrates the cooperation of the valve seat and valve member of FIG. 5.

Figure 7:
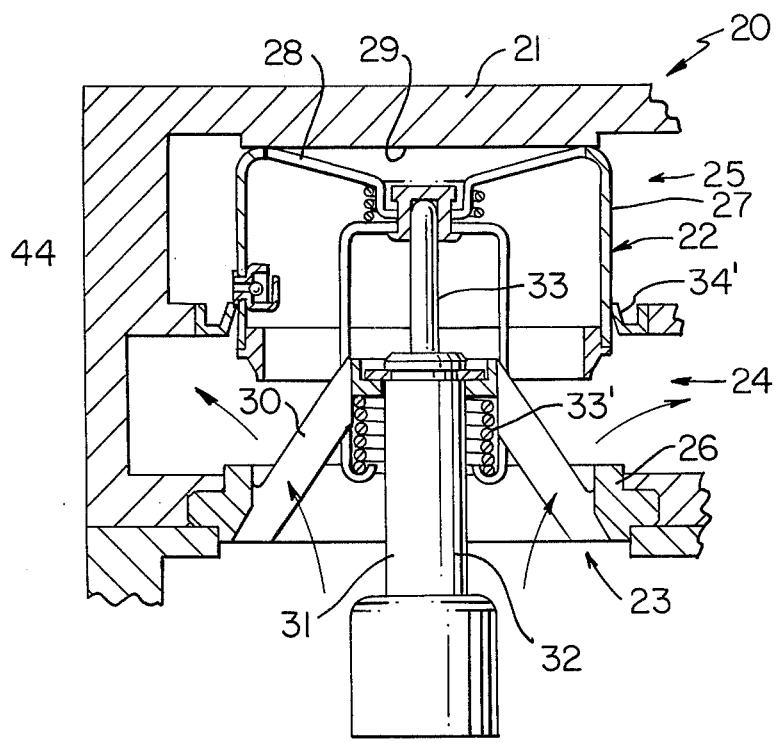
FIG. 7 is a view similar to FIG. 1 and illustrates the valve construction in its fully opened condition.

While the various features of this invention are hereinafter described and illustrated as being particularly adapted to provide a thermostatically operated valve construction for an engine coolant system, it is to be understood that the various features of this invention can be utilized singly or in any combination thereof to provide a valve construction for other systems as desired.

Therefore, this invention is not to be limited to only the embodiments illustrated in the drawings, because the drawings are merely utilized to illustrate one of the wide variety of uses of this invention.

Referring now to FIGS. 1 and 2, the improved engine coolant system of this invention is generally indicated by the reference numeral 20 and comprises a housing means 21 containing the improved thermostatically operated valve construction of this invention that is generally indicated by the reference numeral 22.

The housing 21 is divided into three chambers 23, 24 and 25 with the chamber 23 being in fluid communication with the coolant flow from the engine (not shown), chamber 24 being in fluid communication with the radiator (not shown) of the engine and chamber 25 being a bypass chamber in fluid communication with the inlet of the water pump (not shown) of the engine for reasons fully set forth in the aforementioned U.S. patents to Wagner.

The thermostatically operated valve construction 22 of this invention includes an annular valve seat 26 disposed between the engine coolant chamber 23 and the radiator chamber 24 with the annular valve seat 26 being adapted to be opened and closed by a cup-shaped, sleeve valve member 27 having an open upper end 28 adapted to be in fluid communication with the bypass chamber 22 when the upper end 28 of the sleeve valve 27 is not disposed against an upper surface 29 of the housing 21 in the manner illustrated in FIG. 7 where no coolant is permitted to flow through the valve member 27 to the bypass chamber 22 as will be apparent hereinafter. However, at all other positions of the valve member 27, at least some of the coolant will flow through the open end 28 to the bypass chamber 25 when the engine is running.

A web portion 30 of the annular valve seat 26 carries a piston and cylinder temperature responsive power element 31 in such a manner that the cylinder means 32 of the power element 31 is held stationary by the web structure 30 while the movable piston 33 of the power element 31 is operatively interconnected to the sleeve valve member 27 to move the same upwardly in opposition to the force of a compression spring 33' and downwardly as illustrated in the drawings depending upon the temperature being sensed by the condition responsive medium in the cylinder 32 in a manner well known in the art.

The sleeve valve member 27, during its axially up and down movement, slides against a sealing member 34' that separates the chambers 24 and 25 so that no fluid flow occurs between the chambers 24 and 25 through the seal 34' and the only flow of fluid from the chamber 23 to the chamber 25 is through the open end 28 of the sleeve valve member 27 and the only flow of fluid from the chamber 23 to the radiator chamber 24 is through the valve seat 26 when the same is opened by the sleeve valve member 27 in a manner hereinafter described.

The lower end 34 of the sleeve valve member 27 carries an annular projecting part 35 that has a portion 36 thereof disposed inside the inner surface 37 of the sleeve valve member 27 and outwardly directed annular flange 38 that abuts against the end 34 of the sleeve 27, the annular part 35 being secured in such a position to the sleeve valve member 27 in any suitable manner.

The projecting part 35 of the sleeve valve member 27 includes a first depending portion 39 that defines a substantially frusto-conical outer peripheral surface or configuration 40 that is adapted to abut against the inner corner 45 of the valve seat 26 to close the same in the manner illustrated in FIG. 2 and still have a lower part thereof projecting into the annular valve seat 26 as illustrated.

In addition, the annular part 35 of the sleeve valve member 27 has another annular portion 41 disposed below the first annular portion 39 with the same also defining a substantially frusto-conical outer peripheral surface or configuration 42 that is more cylindrical that the first frusto-conical outer peripheral configuration 40 for a purpose hereinafter described, the frusto-conical outer peripheral configuration 42 being disposed closely adjacent the inner cylindrical surface 43 of the valve seat 26 for a purpose hereinafter described.

If desired, the sleeve valve member 27 can contain a vent valve arrangement that is generally indicated by the reference numeral 44 and forms the subject matter of a concurrently filed patent application, Ser. No. 551,282 filed Feb. 20, 1975, and assigned to the same assignee to whom this application is assigned.

The vent valve arrangement 44 is so constructed and arranged that the same is adapted to permit fluid communication therethrough between the chambers 23 and 24 when the engine is not running and should additional coolant fluid be added to the system so that air can escape from the engine chamber 23 during such coolant adding operation. However, when the engine is running, the vent valve arrangement 44 closes to prevent any fluid flow between the chambers 23 and 24 when the valve member 27 is in the closed position illustrated in FIGS. 1 and 2. Thus, such vent valve arrangement 44 performs the function as the commonly known "jiggle" valve means normally utilized for this venting function. For example, see the patent to Branson, U.S. Pat. No. 2,809,835 for such a jiggle valve arrangement.

From the above, it can be seen that the thermostatically operated valve construction 22 of this invention can be formed in a substantially conventional manner while having a unique depending portion 35 thereon to operate in a manner now to be described.

When the engine containing the coolant system 20 in initially started, the temperature of the engine coolant is below the start-to-open temperature of the power element 31 of the thermostatically operated valve construction of this invention whereby the same maintains the sleeve valve member 27 in the closed position against the valve seat 26 in the manner illustrated in FIGS. 1 and 2 so that the entire flow of coolant being passed by the water pump through the engine into the chamber 23 passes through the open end 28 of the sleeve valve member 27 into the bypass chamber 25 which leads back to the inlet of the water pump so that no coolant flow is directed to the radiator through the chamber 24 of the housing 21. In this manner, the engine can begin to heat up to its optimum operating temperature.

However, as the temperature of the coolant begins to increase to a temperature to cause the power element 31 to initially open the valve seat 26 in the manner illustrated in FIGS. 3 and 4, it can be seen that even though the frusto-conical surface 40 of the annular part 35 of the sleeve valve member 27 moves away from the corner 45 of the annular valve seat 26 to permit coolant flow therethrough, the depending part 35 at the frusto-conical surfaces 40 and 42 thereof is still disposed closely adjacent the corner 45 of the valve seat 26 and the inside cylindrical surface 43 thereof so that a metered and reduced amount of coolant flow is now directed from the chamber 26 to the radiator chamber 24 while the remainder of the coolant flow still passes through the open end 28 of the sleeve valve member 27 to the bypass chamber 25.

Further, opening movement of the sleeve valve member 27 by the power element 31 sensing an increase in the coolant temperature causes the sleeve valve member 27 to move further away from the valve seat 26 in the manner illustrated in FIGS. 5 and 6 whereby it can still be seen that the depending part 35 of the sleeve valve 37 is still providing a metered and reduced flow of coolant through the opened valve seat 26 to the radiator chamber 24.

Subsequently, once the sleeve valve member 27 has moved away from the position illustrated in FIGS. 5 and 6 to a more opened position relative to the valve seat 26, the depending part 35 of the valve member 27 no longer plays a flow retarding function and the sleeve valve member 27 will divide the flow of coolant from the chamber 23 between the chambers 24 and 25 depending upon the position of the sleeve valve member 27 relative thereto and, thus, depending, upon the coolant temperature in a conventional manner.

Figure 8:
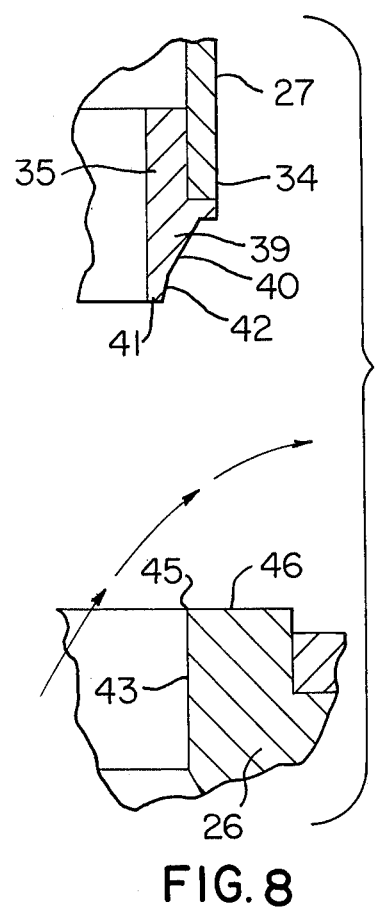
FIG. 8 is a view similar to FIG. 2 and illustrates the cooperation of the valve member and valve seat of FIG. 7.

Once the fully open temperature of the coolant is reached, the power element 31 has moved the sleeve valve member 27 fully against the upper surface 29 of the housing 21 in the manner illustrated in FIGS. 7 and 8 whereby no coolant can now flow to the bypass chamber 25 and the entire flow of coolant from the chamber 23 is to the radiator chamber 24 for maximum cooling thereof at the radiator of the engine in the manner well known in the art.

Thus, it can be seen that during the initial opening movement of the sleeve valve member 27 relative to the valve seat 26 and during a substantial portion of that initial opening movement of the sleeve valve member 27, the depending part 35 of the sleeve valve member 27 provides a metering and reduced flow function on the coolant that passes through the initially opened valve seat 26 so that the thermostatically operated valve construction 22 accomplishes the function of reducing the flow per degree temperature change near the start-to-open temperature range of the thermostatically operated valve construction 22 than would be provided if the part 35 where eliminated and the end 34 of the sleeve valve member 27 merely abutted against the top surface 46 of the annular valve seat 27 in the conventional manner.

If desired, the sleeve insert 35, as well as a flange insert for the valve seat 26, can be formed of hardened and ground steel or other suitable material in such a manner to result in an exceptionally low-leakage rate pass the valve seat 26. Such low-leakage pass the valve seat is a necessity without shutters for the engine radiator since the leakage path is to the radiator which, without shutters to prevent air flow over the radiator, results in very cold coolant to the engine and tests have shown that even small leakage rates to the radiator in extremely cold weather can prevent warmup of the engine to the extent that coolant temperatures can never reach even the thermostat start-to-open temperature.

Figure 9:
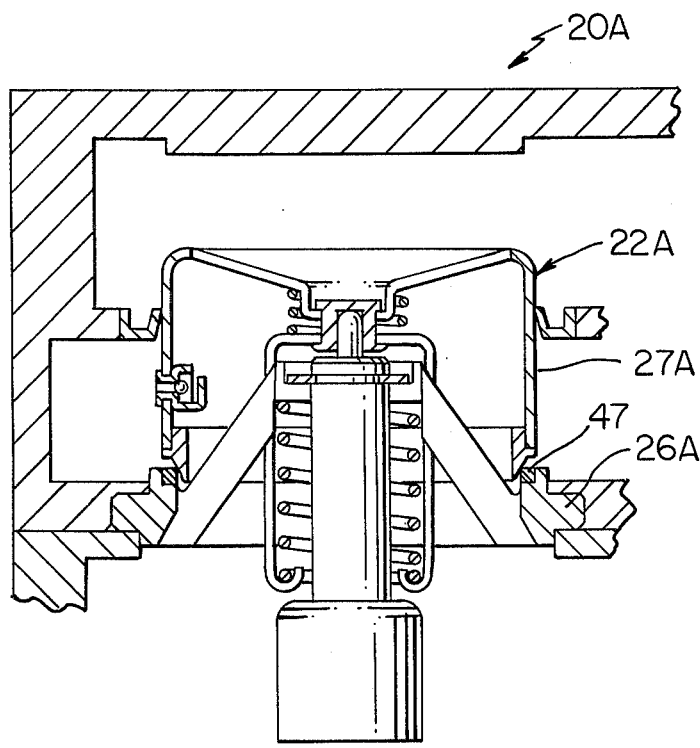
FIG. 9 is a view similar to FIG. 1 and illustrates another embodiment of this invention.

Thus, another embodiment of the thermostatically operated valve construction of this invention is generally indicated by the reference numeral 22A in FIG. 9 for an engine coolant control system 20A wherein parts similar to the thermostatically operated valve construction 22 and system 20 previously described are indicated by like reference numerals followed by the reference letter A.

Figure 10:
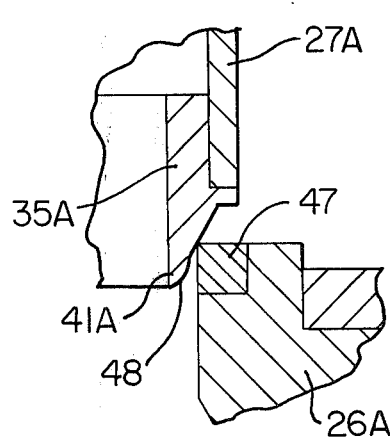
FIG. 10 is a view similar to FIG. 2 and illustrates the valve member and valve seat of the valve construction of FIG. 9.

As illustrated in FIGS. 9 and 10, the thermostatically operated valve construction 22A is substantially identical to the thermostatically operated valve construction 22 previously described except that the annular valve seat 26A has a hardened and ground flange insert 47 carried thereby and the sleeve insert 35A for the sleeve valve member 27A has the lower portion 41A thereof, while being substantially frusto-conical in configuration, defining a convex surface 48 in any axial cross-section thereof with the lower portion 41A still functioning in the same manner as the lower portion 41 of the insert 35 previously described. Further, the insert 35A can be formed of hardened and ground material in the same manner as the flange insert 47 for the reasons previously set forth.

The thermostatically operated valve construction 22A and system 20A in FIGS. 9 and 10 operates in substantially the same manner as the thermostatically operated valve construction 22 and system 20 previously described whereby such operation need not be further described.

Therefore, it can be seen that this invention not only provides an improved engine coolant system, but also this invention provides an improved thermostatically operated valve construction for such a system or the like.

While the forms of the invention now preferred have been described and illustrated as required by the Patent Statute, it is to be understood that other forms can be utilized and still come within the scope of the appended claims.

What is claimed is:

1. In a thermostatically operated valve construction having a tubular sleeve valve member for opening and closing an annular valve seat of the construction at one end of said tubular sleeve valve member and a temperature responsive device interconnected to said sleeve valve member for moving said sleeve valve member relative to said valve seat in relation to sensed temperature, said sleeve valve member having means projecting from said one end thereof into and closely adjacent said annular valve seat when said sleeve valve member is between a closed position and a partially open position to thereby meter the flow through said valve seat during a substantial portion of the initial opening movement of said sleeve valve member, said means of said sleeve valve member comprising an annular part that defines substantially a frusto-conical outer peripheral configuration, said annular part having another annular outer peripheral configuration extending from the smaller end of said frusto-conical configuration, said other annular outer peripheral configuration being substantially frusto-conical, the improvement wherein said annular part has a portion thereof disposed inside said one end of said sleeve valve member and has an outwardly directed transverse annular flange abutting said one end of said sleeve valve member.

* * * * *